May 15, 1951  E. W. TUCKER  2,553,068
ELECTROLYTIC CELL
Filed June 3, 1949
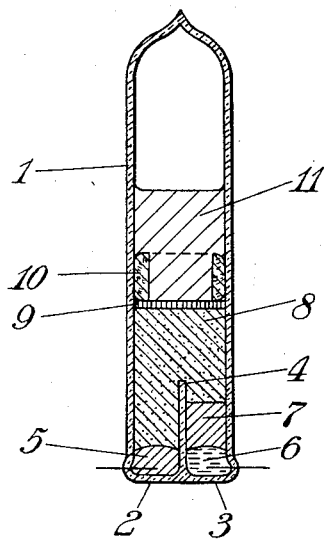
Inventor
E. W. Tucker Patented May 15, 1951

2,553,068

UNITED STATES PATENT OFFICE 2,553,068

ELECTROLYTIC CELL

Edwin William Tucker, Beckenham, England, assignor to Muirhead & Company Limited, Beckenham, England Application June 3, 1949, Serial No. 96,925
In Great Britain September 3, 1948

2 Claims. (Cl. 136—88)

This invention relates to electrolytic cells used as a standard of electromotive force, and in particular to the Weston standard cell.

Generally this cell is in the form of an H form tube the two half cells being contained in the two limbs of the H which are connected together by the horizontal element of the H through which the electrolyte makes a connection.

An improved construction of cell of the Weston type is described in British Specification No. 26,250/47.

In that case the two half cells were located one above the other in a single tube, means being provided for maintaining the mechanical operation necessary between the electrolytic material of the two half cells, such means being constituted by a porous body or mass of insert material.

In this way the two half cells are brought more closely adjacent one to the other than is the case when the container is of H form.

According to the present invention the container comprises a single tubular limb, the lower end of which, that is to say the end which is remote from that portion which contains the main body of the electrolyte is divided by an impermeable partition into two sections forming pockets.

The tube may be of a total length of 2 inches and be divided for the first half inch at one end by a partition and, optionally, furnished with a waist intermediate in the length of the tube.

Into the two pockets of the tube formed by the provision therein of an impermeable partition are inserted the appropriate materials for the two half cells and above this and covering the whole there is provided a layer of cadmium sulphate crystals which may be locked in position in known manner by a crystal locking method involving slow evaporation, or secured by an appropriate plug usually of porous material.

The form of cross-section of the tube may be varied as desired; the tube may be for instance cylindrical throughout its length the lower portion being divided by the impermeable partition to constitute two semi-cylinders.

The invention will be described further in detail and by way of example with reference to the accompanying drawing illustrating in sectional elevation the construction.

In the figure, the container comprises a single limb 1 terminating in a portion which provides two closely adjacent sections or pockets 2 and 3, these two adjacent sections being divided one from the other by an impermeable diaphragm 4 to provide the two pockets.

In the one half cell there is located a body of cadmium amalgam 5 and in the other a body of mercury 6 above which is located a body of mercurous sulphate paste 7 on which is superimposed a body of cadmium sulphate crystals 8 above which is located a porous membrane 9 secured in position by a hollow stopper 10 the diaphragm supporting a quantity of cadmium sulphate solution 11 being introduced into the tube, the main body of the solution being above the diaphragm.

The advantages of construction in accordance with the invention are as follows:

(1) The two half cells are sufficiently close to each other to ensure that substantially no temperature difference can exist between them, hence the difficulty due to the large opposing temperature coefficients of each half in the H formed cell is largely overcome;

(2) The cell can be made in a very compact and economical form;

(3) The resistance of the cell can be kept to a low value if desired, since the conducting path does not necessarily include a porous or crystal-locked barrier;

(4) While the cell is normally mounted vertically with the pockets in which the electrodes are located, at the lower end, it will be found to operate quite satisfactorily when almost horizontal.

I claim:

1. An electric cell adapted to be used as a standard of electromotive force, having a container comprising a single tubular limb the lower end of which, that is to say the end which is remote from the portion which contains the main body of electrolyte, is divided by an impermeable partition into two sections forming pockets.

2. An electric cell as claimed in claim 1, in which the container is a closed tube of a total length of two inches and is divided for the first half-inch at one end by a partition.

EDWIN WILLIAM TUCKER.

REFERENCES CITED

The following references are of record in the file of this patent:

UNITED STATES PATENTS

| Number | Name | Date |
|---|---|---|
| 1,528,076 | Rodman et al. | Mar. 3, 1925 |
| 2,484,593 | Side | Oct. 11, 1949 |